(12) United States Patent
Yu et al.

(10) Patent No.: US 11,947,578 B2
(45) Date of Patent: Apr. 2, 2024

(54) METHOD FOR RETRIEVING MULTI-TURN DIALOGUE, STORAGE MEDIUM, AND ELECTRONIC DEVICE

(71) Applicant: BAIDU ONLINE NETWORK TECHNOLOGY (BEIJING) CO., LTD., Beijing (CN)

(72) Inventors: Xiaofeng Yu, Beijing (CN); Xiyao Lin, Beijing (CN); You Han, Beijing (CN); Litao Zheng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 457 days.

(21) Appl. No.: 17/349,129

(22) Filed: Jun. 16, 2021

(65) Prior Publication Data
US 2021/0311979 A1 Oct. 7, 2021

(30) Foreign Application Priority Data
Jun. 29, 2020 (CN) .......................... 202010605457.0

(51) Int. Cl.
*G06F 16/332* (2019.01)
*G06F 16/31* (2019.01)
(Continued)

(52) U.S. Cl.
CPC ........ *G06F 16/3329* (2019.01); *G06F 16/313* (2019.01); *G06F 40/205* (2020.01);
(Continued)

(58) Field of Classification Search
CPC .. G06F 16/3329; G06F 16/313; G06F 40/284; G06F 40/205; G06F 40/30; G06N 3/04; G06N 3/08; G06N 5/022
See application file for complete search history.

(56) References Cited

U.S. PATENT DOCUMENTS 10,296,848 B1 * 5/2019 Mars ...................... G06N 20/20
11,194,973 B1 * 12/2021 Goel ........................ G06N 3/08
(Continued)

FOREIGN PATENT DOCUMENTS

| CN | 108038209 A | 5/2018 |
|---|---|---|
| CN | 109271496 A | 1/2019 |

(Continued)

OTHER PUBLICATIONS

Wang, Bilateral Multi-Perspective Matching for Natural Language Sentences, arXiv, 2017, whole document (Year: 2017).*
(Continued)

*Primary Examiner* — Sonia L Gay
(74) *Attorney, Agent, or Firm* — Maschoff Brennan (57) ABSTRACT

A method for retrieving a multi-turn dialogue, a storage medium, and an electronic device are provided. The detailed implementation includes: obtaining present question information and context information of the present question information; obtaining a plurality of pieces of candidate reply information of the present question information; generating a context feature based on the context information, and generating a plurality of candidate reply features based on the plurality of pieces of candidate reply information; obtaining consistency information between the context feature and each of the plurality of candidate reply features; selecting a piece of candidate reply information from the plurality of pieces of candidate reply information for replying based on the consistency information between the context feature and each of the plurality of candidate reply features.

14 Claims, 5 Drawing Sheets

(51) Int. Cl.

| | |
|---|---|
| *G06F 40/205* | (2020.01) |
| *G06F 40/284* | (2020.01) |
| *G06F 40/30* | (2020.01) |
| *G06N 3/04* | (2023.01) |
| *G06N 3/08* | (2023.01) |
| *G06N 5/022* | (2023.01) |

(52) U.S. Cl.
CPC ............ *G06F 40/284* (2020.01); *G06F 40/30* (2020.01); *G06N 3/04* (2013.01); *G06N 3/08* (2013.01); *G06N 5/022* (2013.01)

(56) References Cited

U.S. PATENT DOCUMENTS

| | | |
|---|---|---|
| 2009/0287678 A1 | 11/2009 | Brown et al. |
| 2013/0262501 A1 | 10/2013 | Kuchmann-Beauger |
| 2018/0082187 A1 | 3/2018 | Katz et al. |
| 2021/0200813 A1 | 7/2021 | Xu et al. |
| 2021/0398517 A1 | 12/2021 | Iwase |

FOREIGN PATENT DOCUMENTS

| | | |
|---|---|---|
| CN | 109597876 A | 4/2019 |
| CN | 110096567 A | 8/2019 |
| CN | 110309283 A | 10/2019 |
| CN | 110837548 A | 2/2020 |
| CN | 111046132 A | 4/2020 |
| CN | 111108501 A | 5/2020 |
| CN | 111177355 A | 5/2020 |
| CN | 111291172 A | 6/2020 |
| IN | 108280218 A | 7/2018 |
| WO | 2020105302 A1 | 5/2020 |

OTHER PUBLICATIONS

Yan, Leveraging Contextual Sentences for Text Classification by Using a Neural Attention Model, Computatational Intellegence and Neuroscience, 2019, whole document (Year: 2019).*
Search Report for EP application 21179713.9, dated Nov. 29, 2021.
Japanese Office Action dated Jun. 7, 2022 as received in application 2021-064823.
Chinese Office Action dated for Aug. 21, 2023 in application No. 202010605457.0.
Shang et al., "Neural Responding Machine for Short-Text Conversation", Proceedings of the 53rd Annual Meeting of the Association for Computational Linguistics and the 7th International Joint Conference on Natural Language Processing, pp. 1577-1586, Beijing, China, Jul. 26-31, 2015.
Chen et al., "Survey on Deep Learning Based Open Domain Dialogue System", Chinese Journal of Computers, vol. 42., No. 7, Jul. 2019.
Nanjing keji data technology co, "An intention recognition method based on memory network under multi-round conversation", Database technology. Data Base Technique, 1994-2023 China Academic Journal Electronic Publishing.

* cited by examiner

METHOD FOR RETRIEVING MULTI-TURN DIALOGUE, STORAGE MEDIUM, AND ELECTRONIC DEVICE

CROSS-REFERENCE TO RELATED APPLICATIONS

This application claims the benefit of priority to Chinese Application No. 202010605457.0, filed on Jun. 29, 2020, the contents of which are incorporated herein by reference in their entirety.

FIELD

The disclosure relates to a field of computer technologies, and particularly to a field of artificial intelligence and further to natural language processing and deep learning technologies, and more particularly relates to a method for retrieving a multi-turn dialogue, a storage medium, and an electronic device.

BACKGROUND

A question answering (QA) system is a research direction which attracts much attention and has broad development prospects in the field of artificial intelligence and natural language processing technologies. Nowadays, Internet companies compete to develop the question answering system such as a question answering robot, an intelligent customer service agent and so on. An intelligent question answering system plays a vital role particularly in an industry such as a medical industry and an educational industry.

SUMMARY

A method for retrieving a multi-turn dialogue, a storage medium, and an electronic device are provided.

According to a first aspect, a method for retrieving a multi-turn dialogue is provided. The method includes: obtaining present question information and context information of the present question information; obtaining a plurality of pieces of candidate reply information of the present question information; generating a context feature based on the context information, and generating a plurality of candidate reply features based on the plurality of pieces of candidate reply information; obtaining consistency information between the context feature and each of the plurality of candidate reply features; selecting a piece of candidate reply information from the plurality of pieces of candidate reply information for replying based on the consistency information between the context feature and each of the plurality of candidate reply features.

According to a second aspect of the disclosure, an electronic device is provided. The electronic device includes at least one processor and a memory. The memory is communicatively coupled to the at least one processor. The memory is configured to store instructions executable by the at least one processor. The at least one processor is caused to execute the method for retrieving a multi-turn dialogue according to any of embodiments of the disclosure when the instructions are executed by the at least one processor.

According to a third aspect of the disclosure, a non-transitory computer readable storage medium having computer instructions stored thereon is provided. The computer instructions are configured to cause a computer to execute the method for retrieving a multi-turn dialogue according to any of embodiments of the disclosure.

It should be understood that, content described in the Summary is not intended to identify key or important features of embodiments of the disclosure, and not used to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
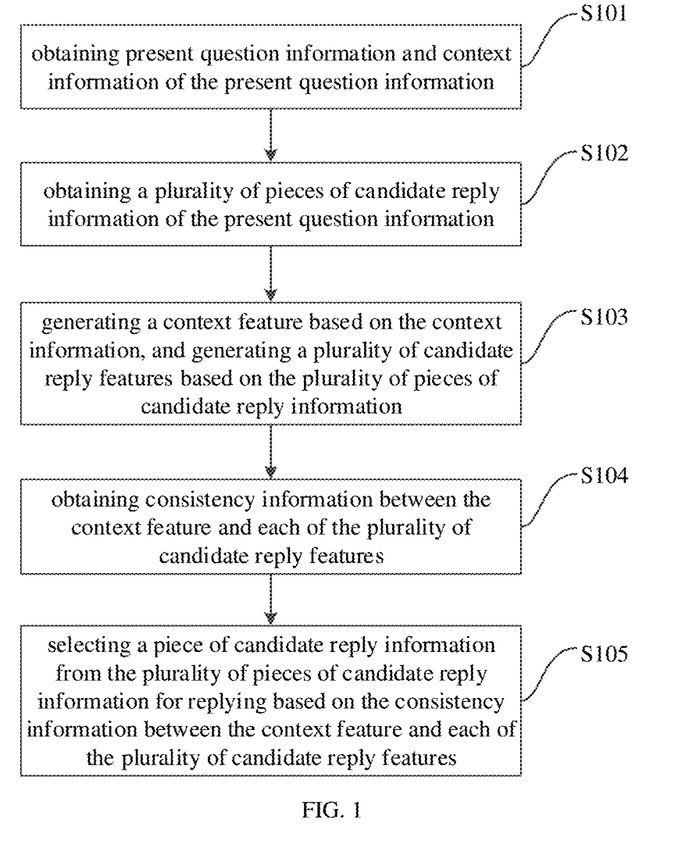
FIG. 1 is a flow chart according to a first embodiment of the disclosure.

FIG. 1 is a flow chart according to a first embodiment of the disclosure. It should be noted that, an execution subject of a method for retrieving a multi-turn dialogue in this embodiment is an apparatus for retrieving a multi-turn dialogue. The apparatus may be implemented by software and/or hardware. The apparatus may be configured in an electronic device. The electronic device may include, but be not limited to, a terminal, a server and so on.

Embodiments of the disclosure relate to a field of artificial intelligence, and further to natural language processing and deep learning technologies. The artificial intelligence, abbreviated as AI, is a new technical science that researches and develops a theory, a method, a technology and an application system for simulating, extending and expanding human intelligence. The deep learning is to learn an inherent law and a representation level of sample data. Information obtained in a learning process has a great help to interpretation of data such as a word, an image and a sound. A final target of the deep learning is to enable a machine to have an analytical learning ability like human beings and recognize the data such as the word, the image and the sound. The natural language processing may implement a variety of theories and methods for performing effective communication between people and a computer by using the natural language.

As illustrated in FIG. 1, the method for retrieving a multi-turn dialogue includes the following.

At block S101, present question information and context information of the present question information are obtained.

A question currently inputted by a user may be called a present question. The present question information may be, such as, content of the present question. That is to say, the present question information inputted by the user may be recognized during the multi-turn dialogue. The context information of the present question information may be obtained while the present question information is obtained. The context information may be, such as, text content of the context of the present question, which is not limited.

It is assumed that the multi-turn dialogue may be represented as $U=\{u_1, u_2, \ldots, u_n\}$, where $u_n$ may represent the present question, a content and a feature contained in $u_n$ may be called as the present question information, and contents and features contained in $u_1, u_2, \ldots$ may be called as the context information.

At block S102, a plurality of pieces of candidate reply information of the present question information are obtained.

The plurality of pieces of candidate reply information of the present question information may be obtained from a dialogue knowledge database after the present question information and the context information of the present question information are obtained. The dialogue knowledge database may be an external knowledge database. That is to say, the external knowledge database accesses a local knowledge database of the apparatus for retrieving the multi-turn dialogue, such that contents provided by the external knowledge database may be referred when reply information is determined.

For example, multiple candidate replies may be represented by $R=\{r_1, r_2, \ldots, r_m\}$ as a list of candidate replies. $Y=\{y_1, y_2, \ldots, y_m\}$ represents respective binary classification labels, where $y_i=1$ represents that $r_i$ is a correct reply; otherwise $y_i=0$. Contents, features and the like related to the candidate replies $R=\{r_1, r_2, \ldots, r_m\}$ may be called as the candidate reply information.

At block S103, a context feature is generated based on the context information, and a plurality of candidate reply features are generated based on the plurality of pieces of candidate reply information.

After the plurality of pieces of candidate reply information of the present question information are obtained, the context feature is further generated based on the context information, and the plurality of candidate reply features are generated based on the plurality of pieces of candidate reply information. The context feature is configured to describe a feature between the context information. The candidate reply feature is configured to describe a feature of respective candidate reply information. The context feature and the candidate reply feature are subsequently configured to determine a most suitable candidate reply.

In some embodiments, feature recognition may be performed on the context information, and a recognized feature is taken as the context feature. The feature recognition may be performed on each piece of candidate reply information, and a recognized feature is taken as the candidate reply feature.

In embodiments of the disclosure, in order to improve the efficiency of feature matching while ensuring an adaptability of the candidate reply to the present question, when there are multiple pieces of context information, the multiple pieces of context information may be spliced to form context aggregation information, and the context feature is generated based on the context aggregation information. That is to say, when there are multiple pieces of context information, each piece of context information corresponds to a context statement, then in embodiments of the disclosure, the multiple pieces of context information may be aggregated to reduce the amount of data and improve the efficiency of subsequent model matching.

The context aggregation information may be configured to describe an aggregation feature of the context information. The context aggregation information may be obtained by directly splicing multiple pieces of context information. The context aggregation information may also be obtained by extracting at least one feature word from each piece of context information and splicing the feature words. The context aggregation information may also be formed in any other possible way.

In embodiments of the disclosure, generating the context feature based on the context aggregation information may include: determining encode features and weights corresponding respectively to the plurality of pieces of context information, and aggregating the encode features based on the weights to obtain the context feature. When the context feature is determined, not only the encode feature corresponding to the context information but also a weight of each encode feature in the context are considered, thereby effectively improving an accuracy of the context feature and ensuring an effect of subsequent model analysis.

As an example, each piece of context information may be inputted into an encode model. The encode model may be pre-trained. The encode feature and the weight corresponding to the piece of context information may be determined by using the encode model, and then the encode features may be aggregated based on the weights to obtain the context feature.

In another embodiment, generating the context feature based on the context aggregation information may also include: determining a cross feature among the plurality of pieces of context information, and taking the cross feature as the context feature. The cross feature among the plurality of pieces of context information may be configured to describe a correlation between the plurality of pieces of context information and to present an intrinsic relevance feature of the plurality of pieces of context information in the entire multi-turn dialogue. Therefore, by recognizing the correlation between the plurality of pieces of context information and the intrinsic relevance feature of the plurality of pieces of context information in the entire multi-turn dialogue, it may assist in determining a more closely matched candidate reply and improving the effect of the multi-turn dialogue.

As an example, a multilayer recurrent neural network (RNN) model may be trained in advance, and the plurality of pieces of context information may be inputted into the RNN model. The RNN model includes a multilayer BiLSTM model, an abbreviation of bi-directional long short-term memory, which is a combination of a forward LSTM and a backward LSTM, such that the cross feature among the plurality of pieces of context information may be determined based on an output of each layer of the BiLSTM.

At block S104, consistency information between the context feature and each of the plurality of candidate reply features is obtained.

After the context feature is generated based on the context information and the plurality of candidate reply features are generated based on the plurality of pieces of candidate reply information, the consistency information between each candidate reply feature and the context feature may be determined.

This consistency information is configured to describe a matching degree between the candidate reply feature and the context feature.

In some embodiments, obtaining the consistency information between the context feature and each of the plurality of candidate reply features may include inputting the context features and the plurality of candidate reply features into a consistency matching model which is trained by using an external dialogue knowledge database to generate the consistency information between the context feature and each of plurality of candidate reply features, and such that the matching degree between each candidate reply feature and the context feature may be learned. Since the consistency matching model is trained by using the external dialogue knowledge database, a matching accuracy of the candidate reply may be improved, a gap between background knowledge, i.e., a gap between the dialogue system and people may effectively made up, an efficiency of obtaining the consistency information is improved, and a replay efficiency of the entire multi-turn dialogue and the dialogue experience of the user are improved while a description effect of the consistency information is ensured.

At block S105, a piece of candidate reply information is selected from the plurality of pieces of candidate reply information for replying based on the consistency information between the context feature and each of the plurality of candidate reply features.

Figure 2:
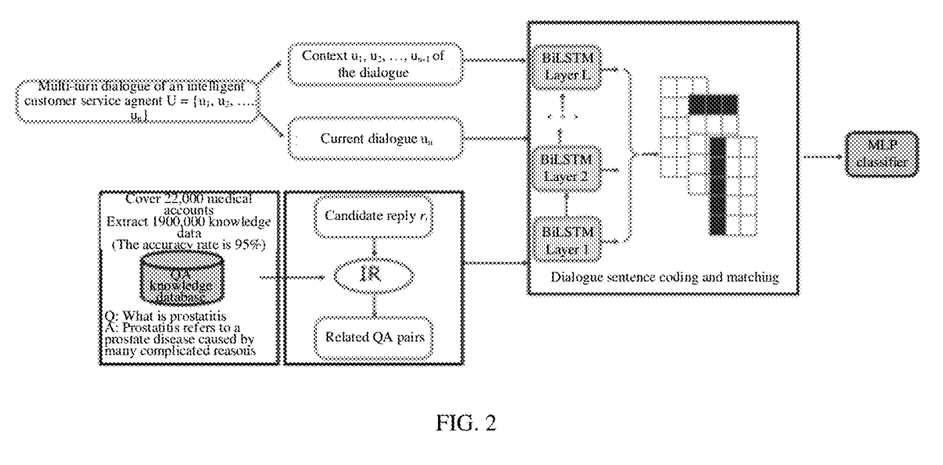
FIG. 2 is a schematic diagram according to a second embodiment of the disclosure.

As an example, referring to FIG. 2, FIG. 2 is a schematic diagram according to a second embodiment of the disclosure. The multi-turn dialogue as an input may be represented as $U=\{u_1, u_2, \ldots, u_n\}$. The context $u_1, u_2, \ldots,$ of the dialogue and the present question $u_n$ are respectively inputted to the multilayer RNN model. Then, the multiple pieces of candidate reply information are also inputted into the multilayer RNN model. The multilayer RNN model generates the context feature based on the context information, and generates the multiple candidate reply features based on the multiple pieces of candidate reply information. After that, the consistency matching model may calculate the consistency information between the context feature and each candidate reply feature. That is to say, the consistency matching model matches encode features of utterance sentences to determine the consistency information between the context feature and multiple candidate reply features, and inputs the consistency information into a classification model. The classification model selects a piece of candidate reply information from the multiple pieces of candidate reply information for replying.

Referring to FIG. 2, all the pieces of context information in dialogue context are spliced into the context aggregation information by employing the multilayer RNN model, and a cross feature between the context feature and the candidate reply feature is calculated for enriching the features of the consistency matching model. When the consistency matching model is trained, an initial time series model may be trained to model the multi-turn dialogue and to aggregate all the pieces of context information. Finally, an MLP (multilayer perceptron) is taken as the classification model at the last layer, and a matching score is returned. A piece of candidate reply information is selected from the multiple pieces of candidate reply information for replying based on the matching score.

The BiLSTM with L layers in FIG. 2 extracts the encode feature of the context information, and an output of each layer of the BiLSTM is weighted and summed as the encode feature of the corresponding context. $w_1$ represents a weight of an attention in the $1^{th}$ layer. Learning from the training process of the consistency matching model may obtain:

$$u_{k,i}^{BiLSTM} = \sum_{l=1}^{L} W_l u_{k,i}^l, i \in \{1, \ldots, 1_{uk}\};$$

$$r_j^{BiLSTM} = \sum_{l=1}^{L} w_l r_j^l, j \in \{1, \ldots, l_r\} \circ,$$

where $U_{k,i}^{BiLSTM}$ represents a learned feature of an $i^{th}$ word of the context k (the subscript k used in a variable represents the variable is related to the context) in the BiLSTM, $U_{k,i}^1$ represents a context feature for the $i^{th}$ word of the context k in the $l^{th}$ layer of the BiLSTM, $l_{uk}$ represents the number of words in the context k, $r_j^{BiLSTM}$ represents a learned feature of an $j^{th}$ word in a candidate reply in the BiLSTM, $r_j^1$ represents a condidate reply feature for the $j^{th}$ word in the $l^{th}$ layer of the BiLSTM, $l_r$ represents the number of words in the candidate reply, and L represents the number of layers of the BiLSTM. The consistency matching model may match each candidate reply with the whole context in a global way, that is, the whole context is regarded as a sequence. A most relevant candidate reply in the context content is selected as the final candidate reply. Irrelevant noise may also be filtered during selecting the most relevant candidate reply in the context content as the final candidate reply, which may effectively improve the matching degree of the candidate reply.

Description about that the context feature and the multiple candidate reply features are processed by the consistency matching model to obtain the consistency information between the context feature and the multiple candidate reply features may be described as follows.

A similarity matrix between each candidate reply feature and the context feature is obtained as $e_{ij}=c_i^{BiLSTM} r_j^{BiLSTM}$. For the $j^{th}$ word $wr_j$ in the candidate replay, a cross feature among a plurality of pieces of context information may be calculated as follows:

$$W_{r_j} = \sum_{i=1}^{l_c} \frac{\exp(e_{ij})}{\sum_{k=1}^{l_c} \exp(e_{kj})} c_i^{BiLSTM}, j \in \{1, \ldots, l_r\}.$$

Based on the same principle, an alignment feature of the candidate reply for the $i^{th}$ word $wc_i$ in the spliced context (the spliced context can be obtained by splicing the plurality of pieces of context information in any of the above mentioned ways) is calculated as follows:

$$W_{c_j} = \sum_{j=1}^{l_r} \frac{\exp(e_{ij})}{\sum_{k=1}^{l_r} \exp(e_{ik})} r_j^{BiLSTM}, i \in \{1, \ldots, l_c\},$$

where $c_i^{BiLSTM}$ represents the $i^{th}$ context feature (i.e., the context feature of the $i^{th}$ piece of context information in the plurality of pieces of context information), $r_j^{BiLSTM}$ represents the $j^{th}$ candidate reply feature (i.e., the learned feature of the $j^{th}$ word in the candidate reply), $e_{ij}=c_i^{BiLSTM} r_j^{BiLSTM}$ represents the similarity matrix, $e_{ij}$ represents an element in the similarity matrix, which represents a weight of an attention between the $i^{th}$ context feature and the $j^{th}$ candidate reply feature, $1_c$ represents the number of words in the spliced context, $1_r$ represents the number of words in the candidate reply, $w_{r_j}$ represents the cross feature among a plurality of pieces of context information of the $j^{th}$ word in the candidate replay and $Wc_i$ represents the alignment feature the candidate reply for the $i^{th}$ word in the spliced feature. Then, each word in the candidate reply feature and the context feature is calculated to form the matching matrix between the candidate reply feature and the context feature, and the matching matrix is employed to determine the consistency information.

In embodiments of the disclosure, artificial intelligence and natural language processing methods are applied to the method for retrieving the multi-turn dialogue, and a mathematical model in the deep learning is trained by employing the content of the external knowledge database. That is to say, the consistency matching model combining the content of the external knowledge database is trained by employing the modeling method in the deep learning, thereby assisting in determining the consistency information between the context feature and the multiple candidate reply features, and implementing efficiently and accurately the determining of the candidate reply in the multi-turn dialogue. The gap between the background knowledge, that is, the gap between the dialogue system and people, may be filled by combining the content of the external knowledge database. The consistency matching model may generate a natural and correct answer to a question with reference to the facts in the knowledge database.

Figure 3:
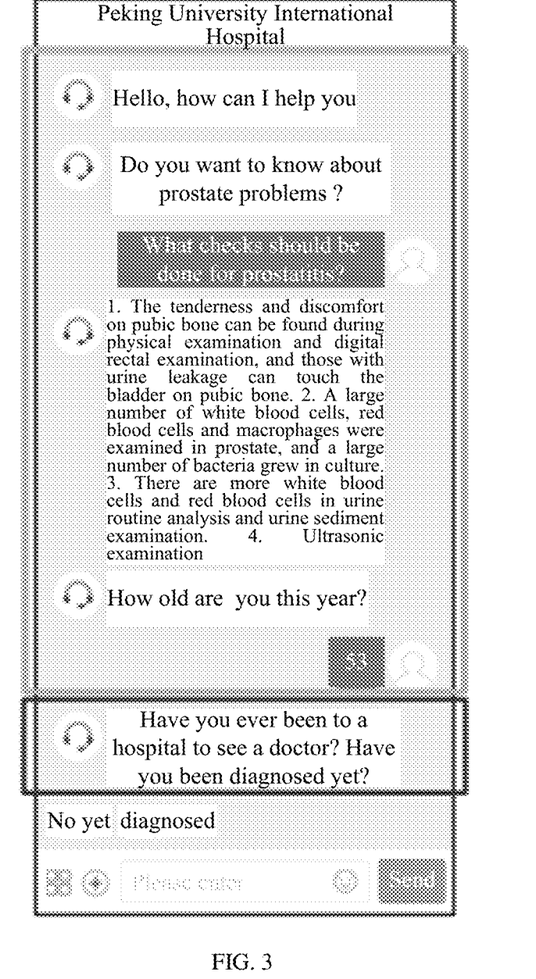
FIG. 3 is a schematic diagram illustrating an application effect according to an embodiment of the disclosure.

Referring to FIG. 3, FIG. 3 is a schematic diagram illustrating an application effect according to an embodiment of the disclosure.

In this embodiment, present question information and context information of the present question information are obtained. Multiple pieces of candidate reply information of the present question information are obtained. A context feature is generated based on the context information. Multiple candidate reply features are generated based on the multiple pieces of candidate reply information. A piece of candidate reply information is selected from the multiple pieces of candidate reply information for replying based on consistency information between the context feature and the multiple candidate reply features. In this way, the matching degree between the reply information and the present question information may be effectively improved, and the dialogue effect of the multi-turn dialogue may be improved, thereby improving the dialogue experience of the user.

Figure 4:
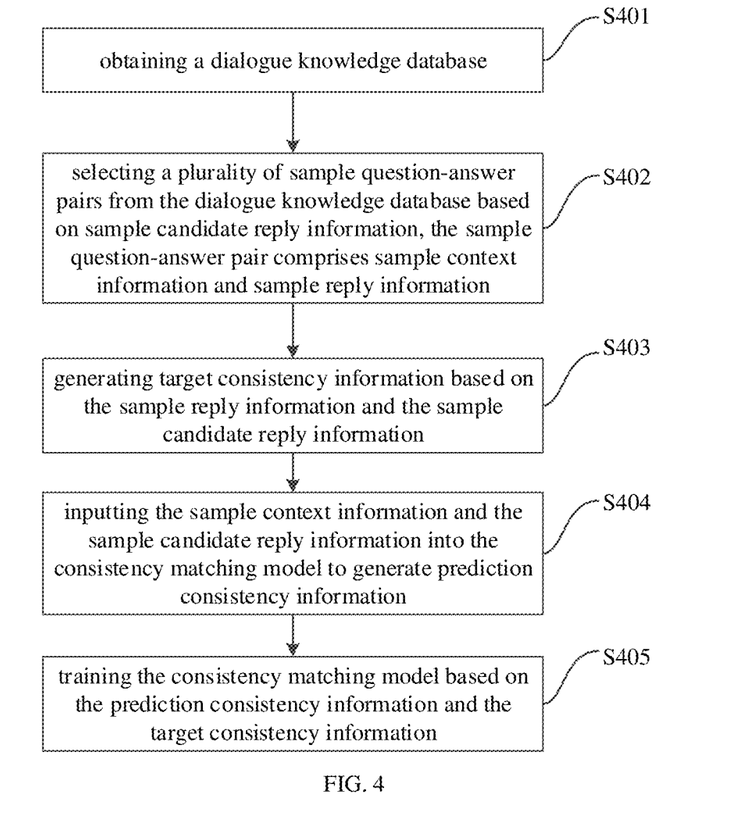
FIG. 4 is a flow chart according to a third embodiment of the disclosure.

FIG. 4 is a flow chart according to a third embodiment of the disclosure.

Referring to FIG. 4, the method for retrieving a multi-turn dialogue also includes the following.

At block S401, a dialogue knowledge database is obtained.

The dialogue knowledge database may be an external knowledge database KB. In other words, the external knowledge database KB accesses a local knowledge database of the apparatus for retrieving a multi-turn dialogue, such that content provided by the external knowledge database may be referred when reply information is determined.

At block S402, a plurality of sample question-answer pairs are selected from the dialogue knowledge database based on sample candidate reply information. The sample question-answer pair includes sample context information and sample reply information.

The plurality of sample question-answer pairs may be expressed as QA pairs. That is to say, the sample candidate reply information $r_j$ is used as a retrieving word to retrieve in the external knowledge database KB, that is, a relevant QA pair is retrieved based on the sample candidate reply information $r_j$, which is expressed as $P=\{Q, A\} \in KB=\{(Q_1, A_1), \ldots (Q_p, A_p)\}$, where the sample question-answer pair includes the sample context information and the sample reply information.

At block S403, target consistency information is generated based on the sample reply information and the sample candidate reply information.

The target consistency information may be generated based on the sample reply information and the sample candidate reply information according to the following formula after the plurality of sample question-answer pairs are selected from the dialogue knowledge database based on the sample candidate reply information. The target consistency information is calibration consistency information for training the consistency matching model.

As an example, $t_{ri}$ may represent the $i^{th}$ word in the sample candidate reply information $r_j$, and $t_{uj}$ represents the $j^h$ word in the dialogue context. The consistency matching matrix may be calculated as follows. $m_{ij}$ is a matrix element.

$$m_{ij} = MI(t_{ri}, t_{uj} \mid \{Q, A\}) = \log \frac{\sum_{k=1}^{r} p(t_{ri} \in A_k, t_{uj} \in Q_k \mid Q_k, A_k)}{p(t_{ri} \mid A) p(t_{uj} \mid Q)}$$

where P represents the number of retrieved related QA pairs, the numerator represents a probability that Q contains $t_{uj}$ and A contains $t_{ri}$ in all the retrieved related QA pairs, the first term of the denominator represents a probability that A contains $t_{ri}$, the second term represents a probability that Q contains $t_{uj}$, $m_{ij}$ represents the matrix element in the consistency matching matrix, MI represents a function identifier of co-occurrence information operation, $A_k$ represents the $K^{th}$ question in the context, and $Q_k$ represents a reply to the $K^{th}$ question. Mutual information of $t_{ri}$ and $t_{uj}$ in the retrieved relevant QA pairs (Q, A) may be obtained based on the above formula, to encode the consistency feature of $t_{ri}$ and $t_{uj}$, thereby obtaining the target consistency information.

At block S404, the sample context information and the sample candidate reply information are inputted into the consistency matching model to generate prediction consistency information.

At block S405, the consistency matching model is trained based on the prediction consistency information and the target consistency information.

After the target consistency information is generated based on the sample reply information and the sample candidate reply information, the sample context information and the sample candidate reply information may be inputted into the consistency matching model to generate prediction consistency information, and the consistency matching model may be trained based on the prediction consistency information and the target consistency information. For example, a loss value between the prediction consistency information and the target consistency information may be generated. It is determined that the training of the consistency matching model is completed when the loss value is lower than a preset threshold. The consistency matching model is continuously trained when the loss value is greater than the preset threshold.

Figure 5:
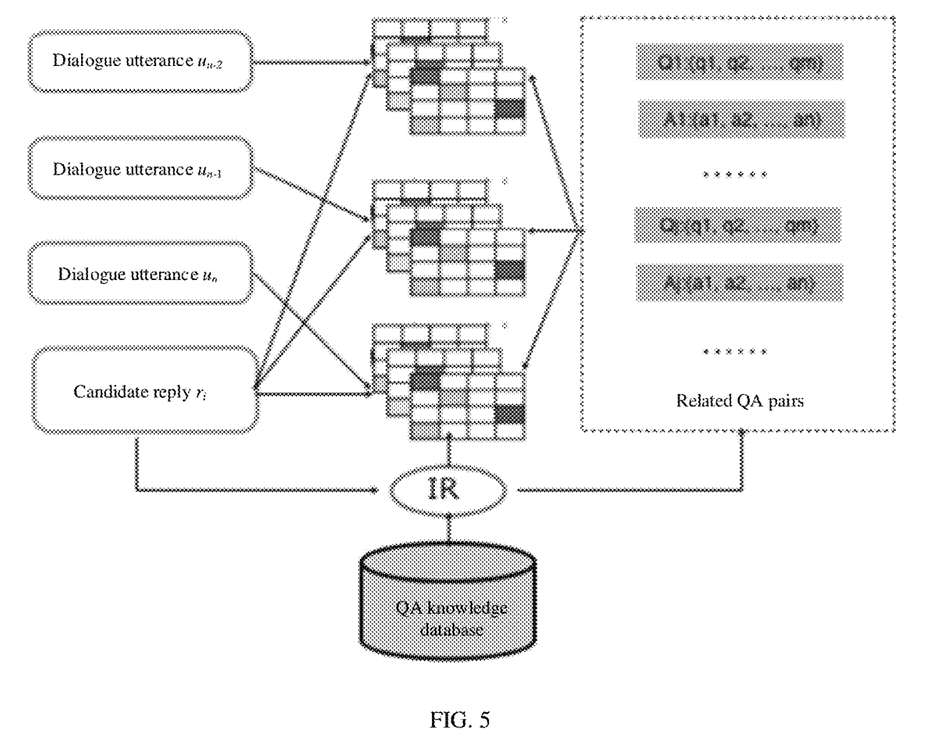
FIG. 5 is a schematic diagram illustrating a modeling scene according to an embodiment of the disclosure.

Referring to FIG. 5, FIG. 5 is a schematic diagram illustrating a modeling scene according to an embodiment of the disclosure.

In this embodiment, a dialogue knowledge database is obtained. Multiple sample question-answer pairs are selected from the dialogue knowledge database based on sample candidate reply information. The sample question-answer pair includes sample context information and sample reply information. Target consistency information is generated based on the sample reply information and the sample candidate reply information. The sample context information and the sample candidate reply information are inputted into the consistency matching model to generate prediction consistency information. The consistency matching model is trained based on the prediction consistency information and the target consistency information. In this way, the trained consistency matching model has a better performance for obtaining the consistency information, such that the consistency matching model may effectively assist the multi-turn dialogue and ensure the efficiency and effect of the multi-turn dialogue.

Figure 6:
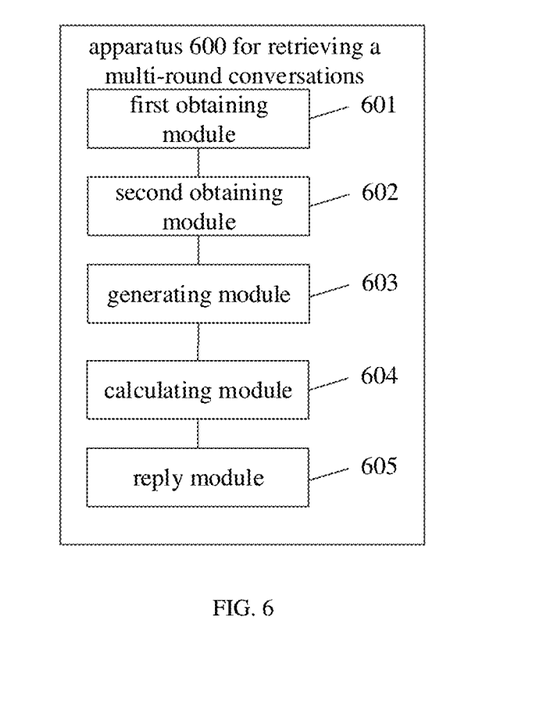
FIG. 6 is a block diagram according to a fourth embodiment of the disclosure.

FIG. 6 is a block diagram according to a fourth embodiment of the disclosure.

As illustrated in FIG. 6, an apparatus 600 for retrieving a multi-turn dialogue includes: a first obtaining module 601, a second obtaining module 602, a generating module 603, a calculating module 604, and a reply module 650.

The first obtaining module 601 is configured to obtain present question information and context information of the present question information.

The second obtaining module 602 is configured to obtain a plurality of pieces of candidate reply information of the present question information.

The generating module 603 is configured to generate a context feature based on the context information, and to generate a plurality of candidate reply features based on the plurality of pieces of candidate reply information.

The calculating module 604 is configured to obtain consistency information between the context feature and each of the plurality of candidate reply features.

The reply module 650 is configured to select a piece of candidate reply information from the plurality of pieces of candidate reply information for replying based on the consistency information between the context feature and each of the plurality of candidate reply features.

In some embodiments of the disclosure, the calculating module 604 is configured to: input the context feature and the plurality of candidate reply features into a consistency matching model to generate the consistency information between the context feature and each of the plurality of candidate reply features.

Figure 7:
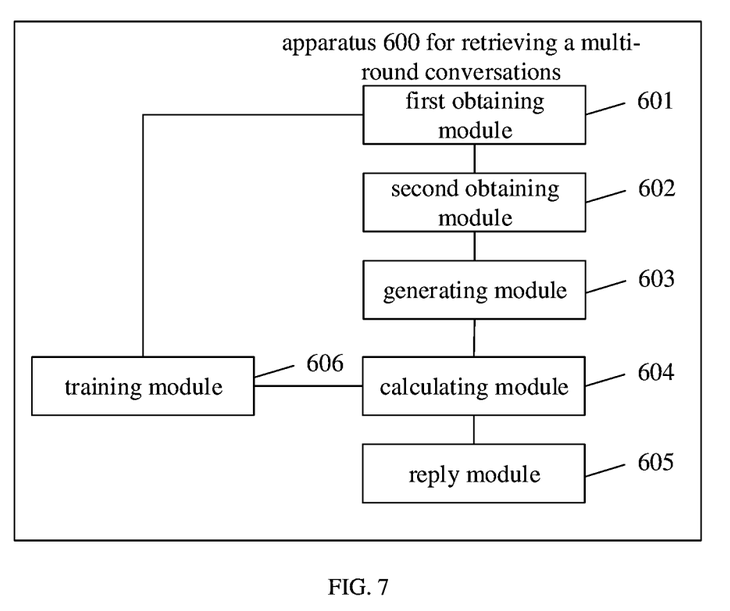
FIG. 7 is a block diagram according to a fifth embodiment of the disclosure.

In some embodiments of the disclosure, referring to FIG. 7, FIG. 7 is a block diagram according to a fifth embodiment of the disclosure. The apparatus further includes a training module 606.

The training module 606 is configured to obtain a dialogue knowledge database; to select a plurality of sample question-answer pairs from the dialogue knowledge database based on sample candidate reply information, the sample question-answer pair including sample context information and sample reply information; to generate target consistency information based on the sample reply information and the sample candidate reply information; to input the sample context information and the sample candidate reply information into the consistency matching model to generate prediction consistency information; and to train the consistency matching model based on the prediction consistency information and the target consistency information.

In some embodiments of the disclosure, there are a plurality of pieces of context information, and the generating module 603 is configured to: splice the plurality of pieces of context information to form context aggregation information; and generate the context feature based on the context aggregation information.

In some embodiments of the disclosure, the generating module 603 is also configured to: determine encode features and weights corresponding respectively to the plurality of pieces of context information; and aggregate the encode features based on the weights to obtain the context feature.

In some embodiments of the disclosure, the generating module 603 is also configured to: determine a cross feature among the plurality of pieces of context information, and taking the cross feature as the context feature.

It should be noted that, the above description for the method for retrieving a multi-turn dialogue may also be applicable to the apparatus for retrieving a multi-turn dialogue according to embodiments of the disclosure, which is not elaborated herein.

In this embodiment, the present question information and the context information of the present question information are obtained. The multiple pieces of candidate reply information of the present question information are obtained. The context feature is generated based on the context information, and the multiple candidate reply features are generated based on the multiple pieces of candidate reply information. A piece of candidate reply information is selected from the multiple pieces of candidate reply information for replying based on the consistency information between the context feature and the multiple candidate reply features. In this way, a matching degree between the reply information and the present question information may be effectively improved, and the dialogue effect of the multi-turn dialogue may be improved, thereby improving the dialogue experience of the user.

According to embodiments of the disclosure, the disclosure also provides an electronic device and a readable storage medium.

Figure 8:
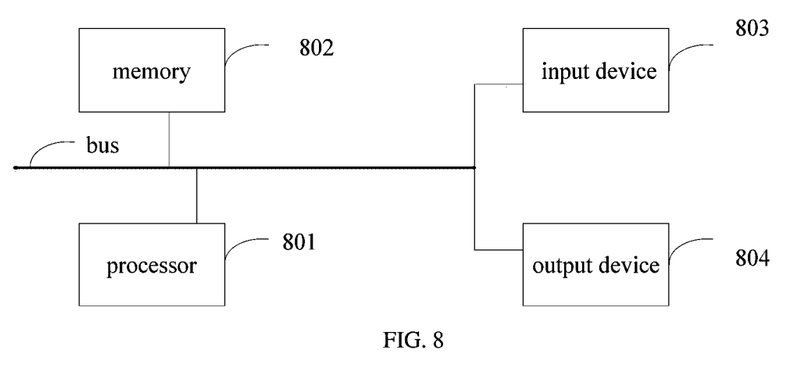
FIG. 8 is a block diagram illustrating an electronic device capable of implementing a method for retrieving a multi-turn dialogue according to an embodiment of the disclosure.

As illustrated in FIG. 8, FIG. 8 is a block diagram illustrating an electronic device capable of implementing a method for retrieving multi-turn dialogue according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 8, a processor 801 is taken as an example.

The memory 802 is a non-transitory computer readable storage medium provided by the disclosure. The memory is configured to store instructions executable by at least one processor, to enable the at least one processor to execute the method for retrieving the multi-turn dialogue provided by the disclosure. The non-transitory computer readable storage medium provided by the disclosure is configured to store computer instructions. The computer instructions are configured to enable a computer to execute the method for retrieving the multi-turn dialogue provided by the disclosure.

As the non-transitory computer readable storage medium, the memory 802 may be configured to store non-transitory software programs, non-transitory computer executable programs and modules, such as program instructions/module (such as the first obtaining module 601, the second obtaining module 602, the generating module 603, the calculating module 604, and the reply module 650 illustrated in FIG. 6) corresponding to the method for retrieving the multi-turn dialogue according to embodiments of the disclosure. The processor 801 is configured to execute various functional applications and data processing of the server by operating non-transitory software programs, instructions and modules stored in the memory 802, that is, implements the method for retrieving the multi-turn dialogue according to the above method embodiments.

The memory 802 may include a storage program region and a storage data region. The storage program region may store an application required by an operating system and at least one function. The storage data region may store data created according to prediction usage of the electronic device based on the semantic representation. In addition, the memory 802 may include a high-speed random accessing memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device may also include: an input device 803 and an output device 804. The processor 801, the memory 802, the input device 803, and the output device 804 may be connected via a bus or in other means. In FIG. 8, the bus is taken as an example.

The input device 803 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network.

A relationship between the client and the server is generated by computer programs operated on a corresponding computer and having a client-server relationship with each other.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for retrieving a multi-turn dialogue, comprising:
    obtaining present question information and context information of the present question information;
    obtaining a plurality of pieces of candidate reply information of the present question information;
    generating a context feature based on the context information, and generating a plurality of candidate reply features based on the plurality of pieces of candidate reply information;
    inputting the context feature and the plurality of candidate reply features into a consistency matching model to generate consistency information between the context feature and each of the plurality of candidate reply features; and
    selecting a piece of candidate reply information from the plurality of pieces of candidate reply information for replying based on the consistency information between the context feature and each of the plurality of candidate reply features;
    wherein the consistency matching model is trained by:
    obtaining a dialogue knowledge database;
    selecting a plurality of sample question-answer pairs from the dialogue knowledge database based on sample candidate reply information, wherein the sample question-answer pair comprises sample context information and sample reply information;
    generating target consistency information based on the sample reply information and the sample candidate reply information;
    inputting the sample context information and the sample candidate reply information into the consistency matching model to generate prediction consistency information; and
    training the consistency matching model based on the prediction consistency information and the target consistency information.

2. The method of claim 1, wherein there are a plurality of pieces of context information, and the generating the context feature based on the context information comprises:
    splicing the plurality of pieces of context information to form context aggregation information; and
    generating the context feature based on the context aggregation information.

3. The method of claim 2, wherein the generating the context feature based on the context aggregation information comprises:
    determining encode features and weights corresponding respectively to the plurality of pieces of context information; and
    aggregating the encode features based on the weights to obtain the context feature.

4. The method of claim 3, wherein the determining the encode features and weights corresponding respectively to the plurality of pieces of context information comprises:
    inputting the plurality of pieces of context information into an encode model to determine the encode features and the weights.

5. The method of claim 2, wherein the generating the context feature based on the context aggregation information comprises:
    determining a cross feature among the plurality of pieces of context information, and taking the cross feature as the context feature.

6. The method of claim 5, wherein the determining the cross feature among the plurality of pieces of context information comprises:
    inputting the plurality of pieces of context information into a recurrent neural network (RNN) model with multiple layers; and
    determining the cross feature among the plurality of pieces of context information based on an output of each layer of the RNN model.

7. An electronic device, comprising:
    at least one processor; and
    a memory, communicatively coupled to the at least one processor,
    wherein the memory is configured to store instructions executable by the at least one processor, and when the instructions are executed by the at least one processor, the at least one processor is caused to execute the method for retrieving a multi-turn dialogue, comprising:
    obtaining present question information and context information of the present question information;
    obtaining a plurality of pieces of candidate reply information of the present question information;
    generating a context feature based on the context information, and generating a plurality of candidate reply features based on the plurality of pieces of candidate reply information;
    input the context feature and the plurality of candidate reply features into a consistency matching model to generate consistency information between the context feature and each of the plurality of candidate reply features; and
    selecting a piece of candidate reply information from the plurality of pieces of candidate reply information for replying based on the consistency information between the context feature and each of the plurality of candidate reply features;
    wherein the consistency matching model is trained by:
    obtaining a dialogue knowledge database:
    selecting a plurality of sample question-answer pairs from the dialogue knowledge database based on sample candidate reply information, wherein the sample question-answer pair comprises sample context information and sample reply information;
    generating target consistency information based on the sample reply information and the sample candidate reply information;

inputting the sample context information and the sample candidate reply information into the consistency matching model to generate prediction consistency information; and training the consistency matching model based on the prediction consistency information and the target consistency information.

8. The electronic device of claim 7, wherein there are a plurality of pieces of context information, and the generating the context feature based on the context information comprises:

splicing the plurality of pieces of context information to form context aggregation information; and generating the context feature based on the context aggregation information.

9. The electronic device of claim 8, wherein the generating the context feature based on the context aggregation information comprises:

determining encode features and weights corresponding respectively to the plurality of pieces of context information; and aggregating the encode features based on the weights to obtain the context feature.

10. The electronic device of claim 9, wherein the determining the encode features and weights corresponding respectively to the plurality of pieces of context information comprises:

inputting the plurality of pieces of context information into an encode model to determine the encode features and the weights.

11. The electronic device of claim 8, wherein the generating the context feature based on the context aggregation information comprises:

determining a cross feature among the plurality of pieces of context information, and taking the cross feature as the context feature.

12. The electronic device of claim 11, wherein the determining the cross feature among the plurality of pieces of context information comprises:

inputting the plurality of pieces of context information into a recurrent neural network (RNN) model with multiple layers; and determining the cross feature among the plurality of pieces of context information based on an output of each layer of the RNN model.

13. A non-transitory computer readable storage medium having computer instructions stored thereon, wherein the computer instructions are configured to cause a computer to execute the method for retrieving a multi-turn dialogue, comprising:

obtaining present question information and context information of the present question information;

obtaining a plurality of pieces of candidate reply information of the present question information;

generating a context feature based on the context information, and generating a plurality of candidate reply features based on the plurality of pieces of candidate reply information;

inputting the context feature and the plurality of candidate reply features into a consistency matching model to generate consistency information between the context feature and each of the plurality of candidate reply features; and selecting a piece of candidate reply information from the plurality of pieces of candidate reply information for replying based on the consistency information between the context feature and each of the plurality of candidate reply features;

wherein the consistency matching model is trained by:

obtaining a dialogue knowledge database;

selecting a plurality of sample question-answer pairs from the dialogue knowledge database based on sample candidate reply information, wherein the sample question-answer pair comprises sample context information and sample reply information;

generating target consistency information based on the sample reply information and the sample candidate reply information;

inputting the sample context information and the sample candidate reply information into the consistency matching model to generate prediction consistency information; and training the consistency matching model based on the prediction consistency information and the target consistency information.

14. The non-transitory computer readable storage medium of claim 13, wherein there are a plurality of pieces of context information, and the generating the context feature based on the context information comprises:

splicing the plurality of pieces of context information to form context aggregation information; and generating the context feature based on the context aggregation information.

* * * * *